United States Patent
Kitahara (10) Patent No.: US 7,890,812 B2
(45) Date of Patent: Feb. 15, 2011

(54) COMPUTER SYSTEM WHICH CONTROLS CLOSING OF BUS

(75) Inventor: Takayuki Kitahara, Kofu (JP)

(73) Assignee: NEC Computertechno. Ltd., Yamanashi (JP)

( * ) Notice: Subject to any disclaimer, the term of this patent is extended or adjusted under 35 U.S.C. 154(b) by 481 days.

(21) Appl. No.: 11/777,308

(22) Filed: Jul. 13, 2007

(65) Prior Publication Data
US 2008/0016405 A1    Jan. 17, 2008

(30) Foreign Application Priority Data
Jul. 13, 2006   (JP)  ............................. 2006-192781

(51) Int. Cl.
*G06F 11/00*  (2006.01)
(52) U.S. Cl. ............................................ 714/44; 714/9
(58) Field of Classification Search ........................ None
See application file for complete search history.

(56) References Cited

U.S. PATENT DOCUMENTS

| | | | | |
|---|---|---|---|---|
| 5,499,346 A * | 3/1996 | Amini et al. | ................ | 710/311 |
| 5,815,647 A * | 9/1998 | Buckland et al. | ................ | 714/3 |
| 6,523,140 B1 * | 2/2003 | Arndt et al. | .................... | 714/44 |
| 6,643,727 B1 * | 11/2003 | Arndt et al. | .................. | 710/314 |
| 7,003,617 B2 * | 2/2006 | Golasky et al. | ............. | 710/315 |
| 7,552,362 B2 * | 6/2009 | Fukui et al. | .................... | 714/44 |
| 2002/0184576 A1 * | 12/2002 | Arndt et al. | .................... | 714/48 |
| 2004/0230861 A1 * | 11/2004 | Bailey et al. | .................... | 714/6 |
| 2005/0177760 A1 | 8/2005 | Oohira | | |
| 2006/0010355 A1 * | 1/2006 | Arndt et al. | ................... | 714/56 |

FOREIGN PATENT DOCUMENTS

JP    2005215809    8/2005

* cited by examiner

*Primary Examiner*—Gabriel L Chu
(74) *Attorney, Agent, or Firm*—Young & Thompson (57) ABSTRACT

A computer system includes a plurality of buses; a device connected with the plurality of buses and configured to generate an error message when a failure has occurred on a first bus of the plurality of buses; and an IO control circuit connected with the device and configured to close the first bus in response to the error message transaction. The device includes a plurality of bus control sections respectively connected with said plurality of buses. The IO control circuit transfer a first operation transaction to the first bus through a first bus control section, and closes the first bus in response to the error message transaction in a bus failure operation when the failure has occurred on the first bus.

13 Claims, 4 Drawing Sheets

COMPUTER SYSTEM WHICH CONTROLS CLOSING OF BUS

TECHNICAL FIELD

The present invention relates to a computer system that contains a PCI (Peripheral Component Interconnect) bus.

BACKGROUND ART

A conventional computer system will be described below by referring to Japanese Laid Open Patent Application (JP-P2005-215809A: a first related art). The computer system described in the first related art contains a processor, an IO control circuit, a PCI bus and a memory (main storage). The processor is connected to the IO control circuit. The memory is connected to the processor and the IO control circuit. The memory stores an OS (Operating System) that includes a driver. The PCI bus is connected to the IO control circuit. A plurality of peripheral devices are connected to the PCI bus.

The processor issues an operation transaction for the PCI bus, in order to execute a job. In this case, the processor outputs the operation transaction through the IO control circuit to the PCI bus. For example, when a failure has occurred on the PCI bus, the IO control circuit sets a bus failure indicator (a closing flag) and closes the PCI bus.

In this case, the processor issues an operation transaction for the PCI bus. In this case, since the closing flag is set, the 10 control circuit generates a closed transaction indicating that the PCI bus has been closed, in response to the operation transaction, and outputs (replies) to the processor. The closed transaction has all bits of "1" (referred to as ALL1) and is represented by FFFFFFFFh in case of a 4-byte data. The processor can determines that the failure has occurred on the PCI bus, because the closed transaction indicating the ALL1 is returned in response to the operation transaction.

When the closed PCI bus is recovered, the IO control circuit releases the closing flag. In this case, the processor again issues an operation transaction for the PCI bus, in order to execute the job. Consequently, in the first related art, even if the failure has occurred on the PCI bus, a recovering and continuing operation is performed, and an error recovery can be attained without any stop of the computer system.

However, in the computer system described in the first related art, the PCI bus is directly connected to the IO control circuit. For this reason, there are the following problems.

When a device connected to the PCI bus is a bridge or switch, there may be a case that one or a plurality of PCI buses are connected to the device. In such a case, if the failure has occurred on the PCI bus in the bridge or switch, the IO control circuit cannot recognize the PCI bus to be closed. In this way, when the device is connected to the IO control circuit and the plurality of PCI buses are connected to the device, the computer system of the first related art cannot close the PCI bus on which the failure has occurred.

Generally, the PCI bus can adopt a bus configuration. However, when a plurality of devices are mounted on the bus, an operational frequency cannot be made high due to electric problems such as the increase in load capacity on a bus and a clock skew. Thus, in recent years, one device is connected to one bus, as in PCI Express, to improve the performance in many cases. However, this method uses the number of the slots. Thus, it is required that many PCI slots are ensured by connecting a PCI bridge or a PCI Express switch to increase buses. General cheap parts are used as the bridge and the switch in many cases. However, the functions described in the first related art are not mounted in the bridge and the switch.

Therefore, when an error recovery is to be realized, the general bridge and switch cannot be used.

SUMMARY

It is therefore an object of the present invention to provide the computer system in which the device is connected to the group of the IO control circuit, and even if the plurality of buses are connected to the group of the device, the bus on which the failure has occurred can be closed.

In an exemplary aspect of the present invention, a computer system includes a plurality of buses; a device connected with the plurality of buses and configured to generate an error message when a failure has occurred on a first bus of the plurality of buses; and an IO control circuit connected with the device and configured to close the first bus in response to the error message.

The device includes a plurality of bus control sections respectively connected with said plurality of buses. The IO control circuit outputs a first operation transaction from a transmission source to the first bus through a first bus control section of the plurality of bus control sections in a normal operation, and closes the first bus in response to an error message transaction as the error message in a bus failure operation when the failure has occurred on the first bus. The IO control circuit stops the output of the first operation transaction from the transmission source to the first bus in a bus closing state in which the first bus is closed.

In another exemplary aspect of the present invention, a method of controlling closing of each of a plurality of buses which are connected with a device in a computer system, includes: generating an error message from the device when a failure has occurred on a first bus of the plurality of buses; and closing the first bus in response to the error message.

In still another exemplary aspect of the present invention, a computer system includes a processor; an IO control circuit connected with the processor; and a device connected with the IO control circuit and a plurality of buses. The device includes an error message generating section for generating an error message when a failure has occurred on a first bus of the plurality of buses. The IO control circuit includes a closing section for closing the first bus in response to the error message.

BRIEF DESCRIPTION OF THE DRAWINGS

The above and other objects, advantages and features of the present invention will be more apparent from the following description of exemplary embodiments taken in conjunction with the accompanying drawings, in which.

EXEMPLARY EMBODIMENTS

Hereinafter, a computer system according to exemplary embodiments of the present invention will be described in detail with reference to the attached drawings.

First Exemplary Embodiment

Figure 1:
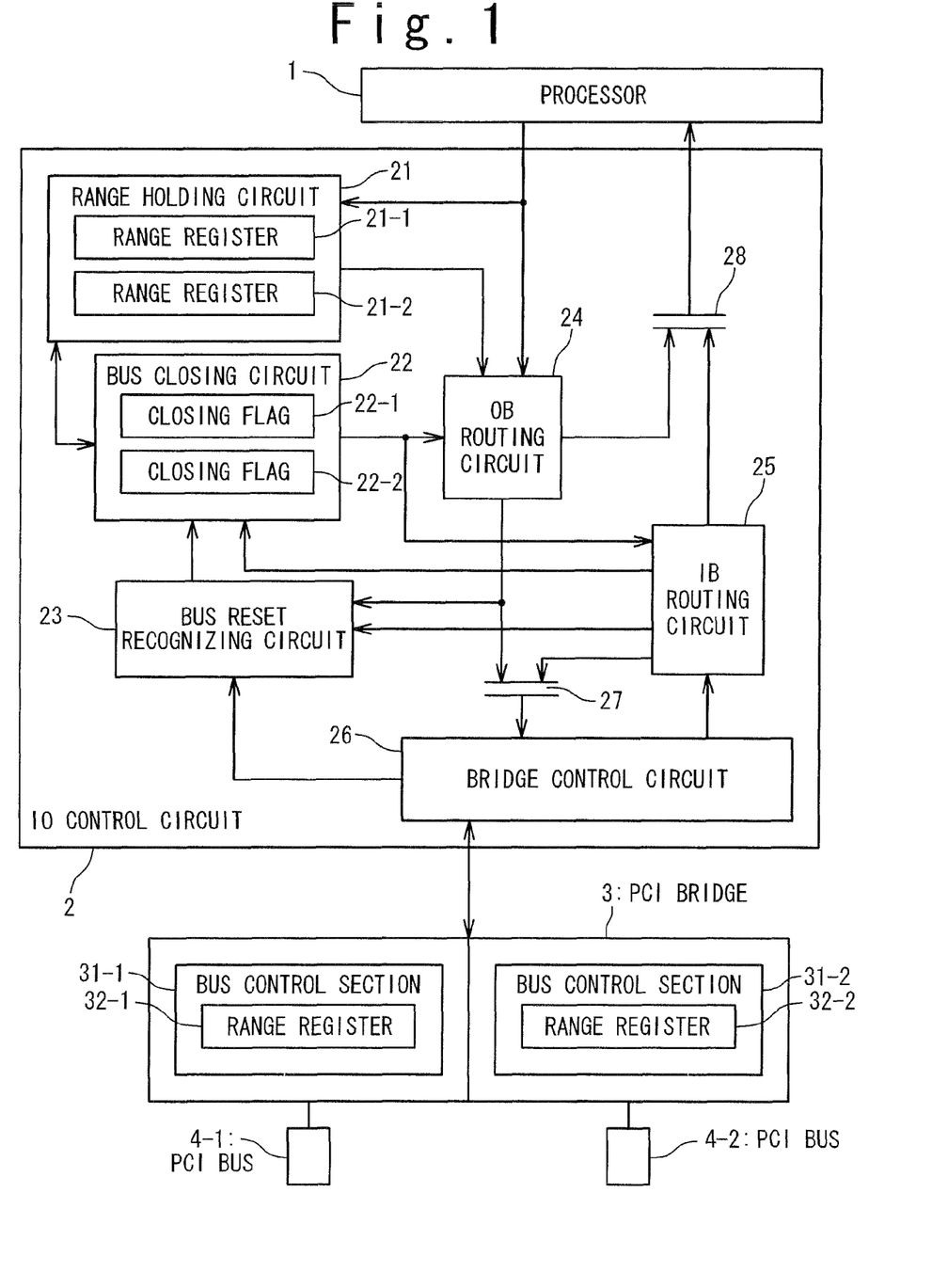
FIG. 1 shows a configuration of a computer system according to a first exemplary embodiment of the present invention.

FIG. 1 shows the configuration of a computer system according to a first exemplary embodiment of the present invention. The computer system contains a processor 1, an IO control circuit 2, a PCI (Peripheral Component Interconnect) device, a plurality of PCI buses 4-1 and 4-2, and a memory (not shown).

The processor 1 is a CPU (Central Processing Unit) or an MPU (Micro Processor Unit), and this is connected to the IO control circuit 2. The memory is connected to the processor 1 and the IO control circuit 2. The memory stores an OS (Operating System) that includes a driver program. As the PCI device, a PCI bridge 3 is exemplified. The PCI bridge 3 is connected to the IO control circuit 2. The plurality of PCI buses 4-1 and 4-2 are connected to the PCI bridge 3. As a peripheral device, an IO card (not shown) is connected to each of the plurality of PCI buses 4-1 and 4-2.

The IO control circuit 2 contains a range holding circuit 21, a bus closing circuit 22, a bus reset recognizing circuit 23, an OB (Outbound) routing circuit 24, an IB (Inbound) routing circuit 25, a bridge control circuit 26 and selectors 27 and 28.

The range holding circuit 21 has a plurality of range registers 21-1 and 21-2. The plurality of range registers 21-1 and 21-2 are related to the plurality of PCI buses 4-1 and 4-2, respectively. The plurality of range registers 21-1 and 21-2 store function numbers, to be described later, serving as identifiers.

The bus closing circuit 22 is connected to the bus reset recognizing circuit 23 and the IB routing circuit 25. A plurality of closing flags (closing data) 22-1 and 22-2 are provided for the bus closing circuit 22. The plurality of closing flags 22-1 and 22-2 are related to the plurality of PCI buses 4-1 and 4-2, respectively. For example, the setting of the closing flag 22-1 of the bus closing circuit 22 indicates that the IO control circuit 2 has closed the PCI bus 4-1 on which a failure has occurred.

The bus reset recognizing circuit 23 is connected to the OB routing circuit 24, the IB routing circuit 25 and the bridge control circuit 26. The OB routing circuit 24 is connected to the processor 1, the range holding circuit 21 and the bus closing circuit 22. The IB routing circuit 25 is connected to the bridge control circuit 26 and the bus closing circuit 22. The bridge control circuit 26 is connected to the PCI bridge 3. The bridge control circuit 26 controls the I/F (Interface) to the PCI bridge 3 in accordance with a PCI protocol.

The selector 27 is connected to the OB routing circuit 24, the IB routing circuit 25 and the bridge control circuit 26. The selector 27 outputs a transaction from the OB routing circuit 24 or a reply transaction from the IB routing circuit 25 to the bridge control circuit 26. The selector 28 is connected to the OB routing circuit 24, the IB routing circuit 25 and the processor 1. The selector 28 outputs a transaction from the IB routing circuit 25 or a reply transaction from the OB routing circuit 24 to the processor 1.

The PCI bridge 3 contains a plurality of bus control sections 31-1 and 31-2. The plurality of bus control sections 31-1 and 31-2 are related to the plurality of PCI buses 4-1 and 4-2, respectively. Bus numbers serving as identifiers to identify the plurality of PCI buses 4-1 and 4-2 are assigned to the plurality of bus control sections 31-1 and 31-2, respectively. The plurality of bus control sections 31-1 and 31-2 contain a plurality of range registers 32-1 and 32-2. The plurality of range registers 32-1 and 32-2 are related to the plurality of PCI buses 4-1 and 4-2, respectively. The plurality of range registers 32-1 and 32-2 store function numbers, to be described later, serving as the identifiers to identify the plurality of bus control sections 31-1 and 31-2, respectively.

The plurality of PCI buses 4-1 and 4-2 contain a plurality of reset registers (not shown), respectively. Register numbers to identify the reset registers are assigned to the plurality of reset registers, respectively. When "1" is set to the plurality of reset registers, the plurality of PCI buses 4-1 and 4-2 are reset, respectively.

Since the configuration of the processor 1 and the memory are well known, their explanation is omitted. Also, the configuration of components other than the PCI bridge 3 and the plurality of PCI buses 4-1 and 4-2 are well known, their explanation is omitted.

The operation of the computer system will be described below. As an operation of the computer system, there are shown a (S1) initializing operation, a (S2) normal operation, a (S3) PCI bus failure measuring operation, a (S4) PCI bus closing operation, and a (5) PCI bus recovering operation.

At first, the (S1) initializing operation will be described. The initialization of the PCI bridge 3 is performed through first and second initializing configuration write transactions for the range registers 32-1 and 32-2. The first and second initializing configuration write transactions include first and second addresses, respectively. The first and second addresses are defined based on the PCI specification, and include first and second bus numbers, first and second function numbers, and first and second register numbers, respectively. They will be specifically described.

The processor 1 issues the first initializing configuration write transaction for the range register 32-1. The first initializing configuration write transaction is outputted to an OB (Outbound) direction. That is, the processor 1 outputs the first initializing configuration write transaction to the IO control circuit 2, and the OB routing circuit 24 in the IO control circuit 2 receives the first initializing configuration write transaction and outputs to the bridge control circuit 26 through the selector 27. The bridge control circuit 26 outputs the first initializing configuration write transaction to the PCI bridge 3. The bus control section 31-1 in the PCI bridge 3 performs the first initializing configuration transaction from the bridge control circuit 26. At this time, the bus control section 31-1 stores the first function number included in the first address of the first initializing configuration write transaction in the range register 32-1.

The bus control section 31-1 in the PCI bridge 3 generates a first initializing reply transaction that is a reply for the first initializing configuration write transaction. The first initializing reply transaction is outputted to an IB (Inbound) direction. That is, the bus control section 31-1 outputs the first initializing reply transaction to the IO control circuit 2, and the bridge control circuit 26 in the IO control circuit 2 outputs the first initializing reply transaction to the IB routing circuit 25. The IB routing circuit 25 outputs the first initializing reply transaction to the processor 1 through the selector 28.

The range holding circuit 21 monitors transactions from the processor 1 to the OB routing circuit 24. The range holding circuit 21 stores the first function number, which is included in its first address, in the range register 21-1 in response to the first initializing configuration write transaction.

Next, similar to the first initializing configuration write transaction, the processor 1 issues the second initializing configuration write transaction for the range register 32-2. In this case, the second initializing configuration write transaction is outputted to the OB direction. The bus control section 31-2 in the PCI bridge 3 performs the second initializing configuration write transaction. At this time, the bus control section 31-2 stores the second function number, which is included in the second address of the second initializing configuration write transaction, in the range register 32-2.

The bus control section 31-2 generates the second initializing reply transaction as the reply for the second initializing configuration write transaction. In this case, the second initializing reply transaction is outputted to the IB direction.

The range holding circuit 21 stores the second function number, which is included in its second address, in the range register 21-2 in response to the second initializing configuration transaction.

As a result, at the time of the completion of the (S1) initializing operation, the same value (the first function number) is stored in the range registers 21-1 and 32-1, and the same value (the second function number) is stored in the range registers 21-2 and 32-2.

The (S2) normal operation will be described below. For example, the processor 1 issues a first operation transaction for the PCI bus 4-1 (an IO card) in order to perform a job. The first operation transaction is outputted to pass through the OB routing circuit 24. In this case, the processor 1 outputs the first operation transaction to the IO control circuit 2. The first function number included in the first address of the first operation transaction is coincident with the function number stored in the range register 21-1 in the range holding circuit 21. At this time, since the closing flag corresponding to the range register 21-1 is not set in the bus closing circuit 22, which will be described later, the OB routing circuit 24 in the IO control circuit 2 outputs the first operation transaction to the bridge control circuit 26 through the selector 27. The bridge control circuit 26 outputs the first operation transaction to the PCI bridge 3. Here, the first bus number included in the first address of the first operation transaction is coincident with the bus number assigned to the bus control section 31-1 in the PCI bridge 3. Thus, the bus control section 31-1 outputs the first operation transaction to the PCI bus 4-1.

In this way, when the first operation transaction is a transaction requiring a reply, the bus control section 31-1 in the PCI bridge 3 generates a first operation reply transaction as a reply for the first operation transaction. The first operation reply transaction is outputted to pass through the IB routing circuit 25. In this case, the bus control section 31-1 outputs the first operation reply transaction to the IO control circuit 2, and the bridge control circuit 26 in the IO control circuit 2 outputs the first operation reply transaction to the IB routing circuit 25. The IB routing circuit 25 outputs the first operation reply transaction to the processor 1 through the selector 28.

The (S3) PCI bus failure measuring operation will be described below. When a failure has occurred on the PCI buses 4-1 and 4-2, the bus control sections 31-1 and 31-2 generate an error message. This will be specifically described.

For example, when a failure has occurred in the PCI bus 4-1, the bus control section 31-1 generates an error message transaction. This error message transaction includes a transaction ID. The first function number stored in the range register 32-1 in the bus control section 31-1 is added to the transaction ID. The error message transaction is outputted toward the IB routing circuit 25. In this case, the bus control section 31-1 outputs the error message transaction to the IO control circuit 2. The bridge control circuit 26 in the IO control circuit 2 outputs the error message transaction to the IB routing circuit 25. The IB routing circuit 25 outputs the error message transaction to the bus closing circuit 22. The bus closing circuit 22 extracts the first function number from the transaction ID in the error message transaction and compares the extracted function number with the function numbers stored in the range registers 21-1 and 21-2 in the range holding circuit 21. Consequently, the bus closing circuit 22 specifies the PCI bus on which the failure has occurred, and then sets the closing flag corresponding thereto. In this case, the extracted first function number is coincident with the function number stored in the range register 21-1. Thus, the bus closing circuit 22 sets the closing flag 22-1 corresponding to the range register 21-1. The IO control circuit 2 sets this closing flag 22-1 and consequently carries out a bus closing operation for closing the PCI bus 4-1.

In this way, according to the present invention, even if the PCI bridge 3 is connected to the IO control circuit 2 and then the plurality of PCI buses are connected to the PCI bridge 3, the IO control circuit 2 can close the PCI bus 4-1 on which the failure has occurred by setting the closing flag 22-1. In this case, the IO control circuit 2 performs the following (S4) PCI bus closing operation.

The (S4) PCI bus closing operation will be described below. For example, the processor 1 issues the first operation transaction for the PCI bus 4-1. The first operation transaction is outputted to the OB direction. In this case, the processor 1 outputs the first operation transaction to the IO control circuit 2. The first function number included in the first address in the first operation transaction is coincident with the function number stored in the range register 21-1 in the range holding circuit 21. At this time, since the closing flag 22-1 corresponding to the range register 21-1 is set in the bus closing circuit 22, the OB routing circuit 24 in the IO control circuit 2 determines and recognizes that the PCI bus 4-1 is closed.

In this way, when the first operation transaction is the transaction requiring a reply, the OB routing circuit 24 generates a first closing transaction to indicate that the PCI bus 4-1 is closed for the first operation transaction, and then outputs and replies to the processor 1 through the selector 27. The first closing transaction is represented by FFFFFFFFh, for example, when all bits are 1 (to be referred to as ALL1) and in case of a 4-byte data. The processor 1 can determine that the failure has occurred in the PCI bus 4-1 because the first closing transaction indicating the ALL1 is returned for the first operation transaction.

When the first operation transaction is the transaction that does not require a reply, the OB routing circuit 24 discards the first operation transaction.

On the other hand, when the processor 1 issues the second operation transaction for the PCI bus 4-2 since the PCI bus 4-2 is not closed, the (S2) normal operation is performed. That is, the second operation transaction is outputted to the OB direction. For example, the bus control section 31-1 in the PCI bridge 3 generates a request transaction for a request from the PCI bus 4-1. This request transaction includes the transaction ID to which the first function number stored in the range register 32-1 in the bus control section 31-1 is added. In this case, the bus control section 31-1 outputs the request transaction to the IO control circuit 2. The bridge control circuit 26 in the IO control circuit 2 outputs the request transaction to the IB routing circuit 25. The first function number of the transaction ID included in the request transaction is coincident with the function number stored in the range register 21-1 in the range holding circuit 21. At this time, since the closing flag 22-1 corresponding to the range register 21-1 is set in the bus closing circuit 22, the IB routing circuit 25 determines and recognizes that the PCI bus 4-1 is closed.

In this way, when the request transaction is a transaction requiring a reply, the IB routing circuit 25 generates a transaction indicating an Unsupported request for the request transaction and outputs to the PCI bridge 3 through the selector 27. When the request transaction is a transaction that does not require the reply, the IB routing circuit 25 discards the request transaction.

On the other hand, the bus control section 31-2 in the PCI bridge 3 generates the request transaction for the request from the PCI bus 4-2. In this case, since the PCI bus 4-2 is not closed, the (S2) normal operation is performed. That is, the request transaction is outputted to the OB direction.

The (S5) closed PCI bus recovering operation will be described below. The driver program is executed to reset the PCI bus and recover the closed PCI bus. This will be specifically described.

The processor 1 executes the driver program to issue a first resetting configuration write transaction for a reset register in the PCI bus 4-1. The first resetting configuration write transaction includes a first address and a transaction ID, and this is outputted to the OB (Outbound) direction. That is, the processor 1 executes the driver program to output the first resetting configuration write transaction to the IO control circuit 2. The OB routing circuit 24 in the IO control circuit 2 outputs the first resetting configuration write transaction to the bridge control circuit 26 through the selector 27. The bridge control circuit 26 outputs the first resetting configuration write transaction to the PCI bridge 3. Here, the first bus number included in the first address of the first resetting configuration write transaction is coincident with the bus number assigned to the bus control section 31-1 in the PCI bridge 3. Also, the first function number included in the first address is coincident with the function number stored in the range register 32-1 in the bus control section 31-1. Also, the first register number included in the first address coincides with the register number assigned to the reset register in the PCI bus 4-1. In this case, the bus control section 31-1 in the PCI bridge 3 performs the first resetting configuration write transaction from the bridge control circuit 26. Since the reset register in the closed PCI bus 4-1 is set to "1" in response to the transaction, the bus control section 31-1 resets the PCI bus 4-1.

In this way, the bus control section 31-1 in the PCI bridge 3 generates a first resetting reply transaction as a reply for the first resetting configuration write transaction. This first resetting reply transaction includes the first address and the transaction ID, and this is outputted to the IB direction. That is, the bus control section 31-1 outputs the first resetting reply transaction to the IO control circuit 2. The bridge control circuit 26 in the IO control circuit 2 outputs the first resetting reply transaction to the IB routing circuit 25. The IB routing circuit 25 outputs the first resetting reply transaction to the bus reset recognizing circuit 23, and outputs to the processor 1 executing the driver program through the selector 28.

The bus reset recognizing circuit 23 monitors the transactions from the OB routing circuit 24 to the bridge control circuit 26. The bus reset recognizing circuit 23 holds its transaction ID on the basis of the first resetting configuration write transaction. The transaction ID included in the first resetting reply transaction is coincident with the transaction ID held by the bus reset recognizing circuit 23. Also, the first function number included in the first address of the first resetting configuration write transaction or first resetting reply transaction is coincident with the function number stored in the range register 21-1 in the range holding circuit 21. In this case, the bus reset recognizing circuit 23 determines that the resetting of the targeted PCI bus 4-1 is completed and then outputs a first reset instruction to reset the closing flag 22-1 corresponding to the range register 21-1 to the bus closing circuit 22. The bus closing circuit 22 resets the closing flag 22-1 in response to the first reset instruction.

The IO control circuit 2 releases or resets the closing flag 22-1 and consequently resets the closing of the PCI bus 4-1. The reason why the bus reset recognizing circuit 23 waits for the first resetting reply transaction and then resets the closing flag 22-1 is to protect an illegal request from the closed PCI bus 4-1 from being sent to the processor 1, if resetting the closing flag 22-1 prior to the request (before the closed PCI bus 4-1 is recovered).

When the PCI bus 4-1 is recovered, the processor 1 again performs the (S2) normal operation. That is, the processor 1 again issues the first operation transaction for the PCI bus 4-1 (IO card) in order to execute the job. Consequently, in the present invention, even if the failure occurs on the PCI bus 4-1, without any stop of the computer system, the recover and continuing operation is carried out, which can carry out an error recovery.

Figure 2:
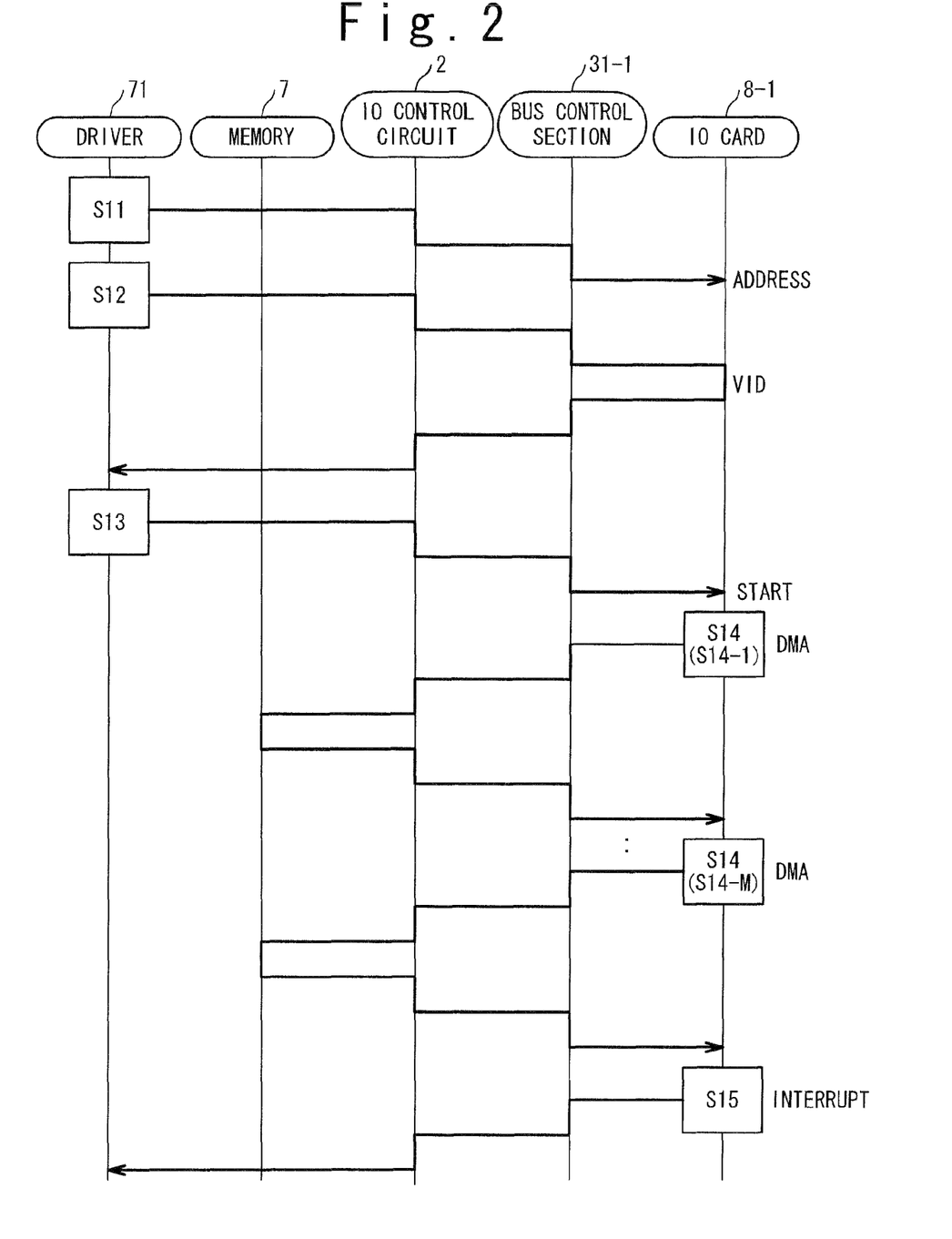
FIG. 2 shows a normal operation, as operations of the computer system according to the first exemplary embodiment of the present invention.

FIG. 2 shows the normal operation, as the operation of the computer system according to the first exemplary embodiment of the present invention. Here, an IO card 8-1 that is the IO card connected to the PCI bus 4-1 is assumed to hold a VID (bender ID).

Operation of (S11)

A driver program 71 serving as the foregoing driver writes a DMA address to the IO card 8-1 through the IO control circuit 2, the bus control section 31-1 and the PCI bus 4-1, in order to perform DMA (Direct Memory Access). In this case, the IO control circuit 2 performs the (S2) normal operation and outputs the first operation transaction as a write transaction for the PCI bus 4-1 (IO card 8-1) to the bus control section 31-1. The first operation transaction at this time is referred to as a posted write, and the reply is not required.

Operation of (S12)

Next, the driver program 71 reads the VID (bender ID) held by the IO card 8-1 through the IO control circuit 2, the bus control section 31-1 and the PCI bus 4-1 in order to check whether or not a series of the operations of the (S11) is normally completed. In this case, the IO control circuit 2 performs the (S2) normal operation and outputs the first operation transaction as a read transaction for the PCI bus 4-1 (the IO card 8-1) to the bus control section 31-1.

If the (S11) operation is normally completed, the IO card 8-1 reads the VID held by itself and outputs its VID as an expectation value through the PCI bus 4-1, the bus control section 31-1 and the IO control circuit 2. In this case, the IO control circuit 2 performs the (S2) normal operation and outputs the first operation transaction as the transaction including the VID to the driver program 71.

Here, the work of the (S12) is an operation of the driver program 71 that is carried out in the present invention, and it is not typically done. Also, the reading of this VID is performed as necessary, and done only at the (S12) in this example.

Operation of (S13)

When the (S12) operation is normally checked, the driver program 71 actuates the IO card 8-1 through the IO control circuit 2, the bus control section 31-1 and the PCI bus 4-1. In this case, the IO control circuit 2 performs the (S2) normal operation and outputs the first operation transaction, which indicates a start command as the transaction for the PCI bus 4-1 (the IO card 8-1), to the bus control section 31-1. The first operation transaction at this time is performed under the posted write, similarly to the foregoing case.

Operation of (S14)

The IO card 8-1 is actuated in response to the transaction indicating the start command, and reads the data on a memory 7, which is the foregoing memory, through the PCI bus 4-1, controller 31-1 and the IO control circuit 2. The (S14) operation includes the operations of S14-1 to S14-M (M is an integer of 1 or more). The IO card 8-1 reads the predetermined M data from the memory 7, in an order from 1 to M.

The IO card 8-1 generates an interrupt when the transfer of the M data has been completed, and reports the completion to the driver program 71 through the PCI bus 4-1, the bus control section 31-1 and the IO control circuit 2.

Figure 3:
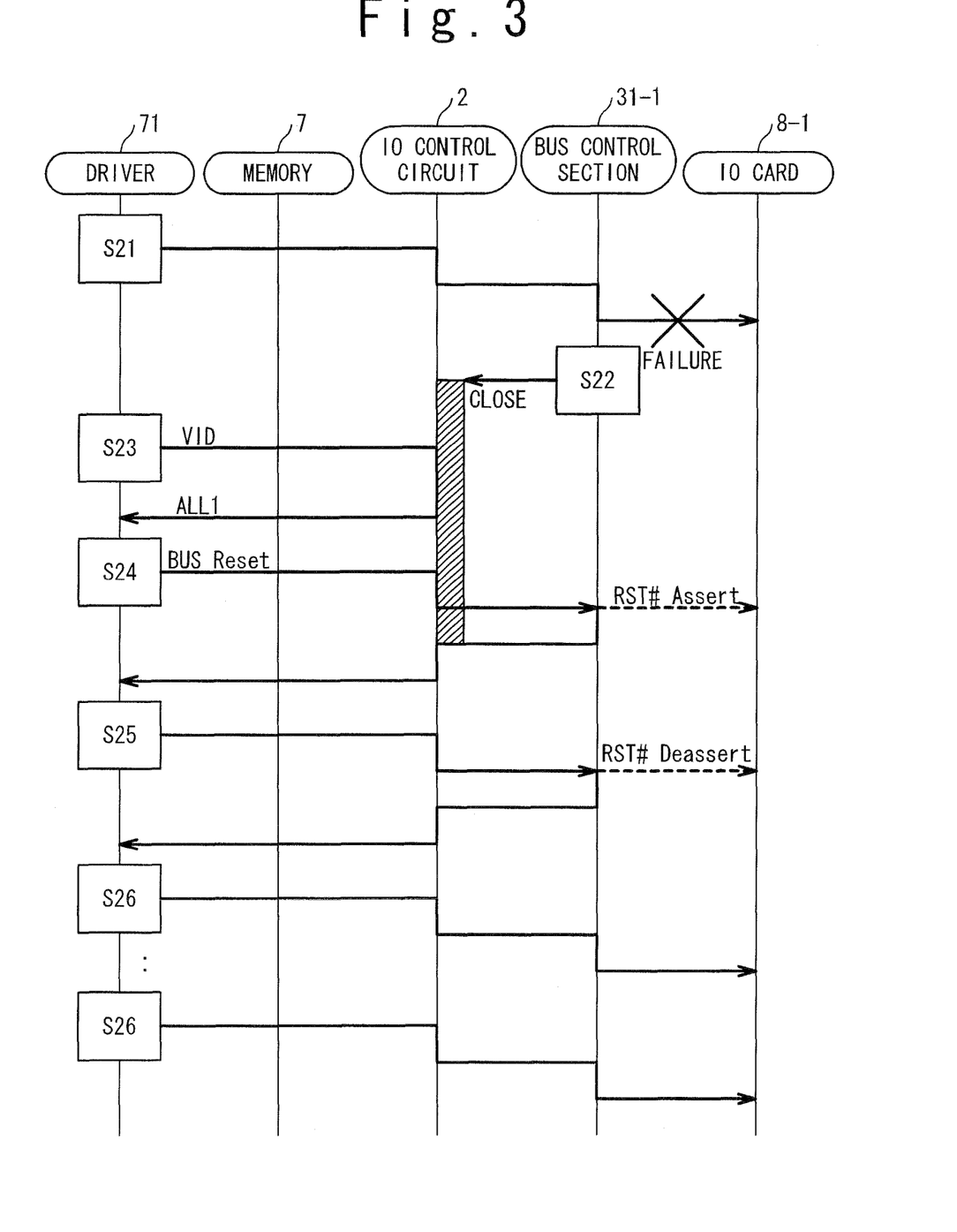
FIG. 3 shows operations when a failure has occurred on a PCI bus 4-1, as the operations of the computer system according to the first exemplary embodiment of the present invention.

FIG. 3 shows the operation when the failure has occurred on the PCI bus 4-1, as the operation of the computer system according to the first exemplary embodiment of the present invention.

At first, the driver program 71 writes an address for the DMA to the IO card 8-1 through the IO control circuit 2, the bus control section 31-1 and the PCI bus 4-1, in order to perform the DMA. In this case, the IO control circuit 2 performs the (S2) normal operation and outputs the first operation transaction as the write transaction for the PCI bus 4-1 (IO card 8-1) to the bus control section 31-1. The first operation transaction at this time is carried out under the posted write. However, since the failure occurs on the PCI bus 4-1, the driver program 71 fails to write the address for the DMA to the IO card 8-1.

Operation of (S22)

Next, the bus control section 31-1 performs the (S3) PCI bus failure measuring operation. That is, the bus control section 31-1 generates an error message transaction and outputs to the IO control circuit 2. The IO control circuit 2 closes the PCI bus 4-1 on the basis of the error message transaction.

Operation of (S23)

Next, in order to check whether or not the series of the (S21) operations is normally completed, the driver program 71 reads the VID (bender ID) held by the IO card 8-1 through the IO control circuit 2, the bus control section 31-1 and the PCI bus 4-1. However, the IO control circuit 2 closes the PCI bus 4-1. In this case, the IO control circuit 2 performs the (4) PCI bus closing operation and outputs the first closing transaction as the reply transaction to the driver program 71 to indicating the ALL1, The driver program 71 determines that the failure has occurred on the IO card 8-1, because the ALL1 is returned, with regard to the reading of the VID. In this case, the driver program 71 recognizes the failure of the job and again performs the job. However, at this time, there is a possibility that the IO card 8-1 is in the illegal state. Thus, the driver program 71 initializes the IO card 8-1.

Operation of (S24)

The driver program 71 issues a bus reset to the PCI bus 4-1 through the IO control circuit 2 and the bus control section 31-1 before initializing the IO card 8-1. In this case, the IO control circuit 2 performs the (S5) closed PCI bus recovering operation and outputs the first resetting configuration write transaction indicating the bus reset, as the configuration write transaction for the PCT bus 4-1, to the bus control section 31-1. The bus control section 31-1 writes "1" to the reset register in the PCI bus 4-1 in response to this first resetting configuration write transaction and asserts a reset signal (RST#) and then resets the PCI bus 4-1. The bus control section 31-1 outputs the first resetting reply transaction as the reply for the first resetting configuration write transaction to the driver program 71 through the IO control circuit 2. At this time, the IO control circuit 2 releases the closing of the PCI bus 4-1 in response to this first resetting reply transaction.

Operation of (S25)

Next, in order to release the bus reset, the driver program 71 issues a bus reset release to the PCI bus 4-1 through the IO control circuit 2 and the bus control section 31-1. In this case, the IO control circuit 2 performs the operation similar to the (S5) closed PCI bus recovering operation, and outputs the first resetting configuration write transaction as the configuration transaction for the PCI bus 4-1 to the bus control section 31-1, to indicate the bus reset release. The bus control section 31-1 writes back "0" to the reset register in the PCI bus 4-1 in response to this first resetting configuration write transaction and de-asserts the reset signal (RST#) and then releases the reset of the PCI bus 4-1. The bus control section 31-1 outputs the first resetting reply transaction as the replay for the first resetting configuration write transaction to the driver program 71 through the IO control circuit 2.

Operation of (S26)

The driver program 71, when the above operations (S24) and (S25) are completed, starts initializing the IO card 8-1. In this case, the IO control circuit 2 performs the (S1) initializing operation.

After that, the driver program 71 performs an error recovery by performing the operation (S11) in order to again perform the job.

The effect of the present invention will be described below. That is, as mentioned above, in the computer system according to the first exemplary embodiment of the present invention, the device (PCI bridge 3) is connected to the IO control circuit 2, and the plurality of PCI buses 4-1 and 4-2 are connected to the PCI bridge 3.

In this way, in the (S2) normal operation, the IO control circuit 2 outputs the first operation transaction from the transmission source (the processor 1, the driver program 71) through the bus control section 31-1 in the PCI bridge 3 to the PCI bus 4-1.

In the (S3) PCI bus failure measuring operation in which the failure has occurred on the PCI bus 4-1, the bus control section 31-1 transmits an error message transaction as an error message indicating the failure, when the failure has occurred on the PCI bus 4-1. The IO control circuit 2 sets the closing flag 21-1 corresponding to the PCI bus 4-1 for the bus closing circuit 22 in response to the error message transaction. Consequently, the IO control circuit 2 closes the PCI bus 4-1.

In the (S4) PCI bus closing operation in which the closing flag 22-1 is set in the bus closing circuit 22, the IO control circuit 2 does not output the first operation transaction from the transmission source (the processor 1, the driver program 71) to the PCI bus 4-1. Thus, when the first operation transaction is the transaction that does not require the reply, the IO control circuit 2 discards the first operation transaction. When the first operation transaction is a transaction requiring the reply, the IO control circuit 2 generates the first closing transaction indicating that the PCI bus 4-1 is closed and then outputs to the transmission source.

In this way, in the computer system according to the first exemplary embodiment of the present invention, even if the PCI bridge 3 is connected to the IO control circuit 2 and further the plurality of PCI buses are connected to the PCI bridge 3, the PCI bus 4-1 on which the failure has occurred can be closed.

In the (S5) closed PCI bus recovering operation when the PCI bus 4-1 is recovered, the IO control circuit 2 outputs the first resetting configuration write transaction from the transmission source (the processor 1, the driver program 71) to the PCI bus 4-1 through the bus control section 31-1 and resets the PCI bus 4-1. The bus control section 31-1 outputs the first resetting reply transaction as the reply for the first resetting configuration transaction to the transmission source (the processor 1, the driver program 71) through the IO control circuit 2. The IO control circuit 2 releases the closing flag 22-1 set in the bus closing circuit 22 in response to the first resetting configuration transaction.

In the (S2) normal operation, the IO control circuit 2 outputs the first operation transaction from the transmission source (the processor 1, the driver program 71) to the PCI bus 4-1 through the bus control section 31-1.

In this way, in the computer system according to the first exemplary embodiment of the present invention, even if the failure has occurred on the PCI bus 4-1, the error recovery can be surely performed by carrying out the recovering and continuing operation without any stop of the system.

In the (S1) initializing operation, the IO control circuit 2 receives a plurality of initializing configuration write transactions from the transmission source (the processor 1, the driver program 71). The IO control circuit 2 stores a plurality of identifiers (the function numbers), which are included in the plurality of initializing configuration write transactions, in the plurality of registers 21-1 and 21-2, respectively, and outputs the plurality of initializing configuration write transactions to the plurality of bus control sections 31-1 and 31-2, respectively. The plurality of bus control sections 31-1 and 31-2 store the plurality of identifiers, which are included in the plurality of initializing configuration write transactions, in the plurality of bus control sections 31-1 and 31-2, respectively. Thus, the plurality of bus control sections 31-1 and 31-2 output a plurality of initialization reply transactions as the replies for the plurality of initializing configuration write transactions to the transmission source through the IO control circuit 2. For example, in the (S3) PCI bus failure measuring operation, when the first identifier included in the error message transaction is coincident with the identifier stored in the first register 21-1 in the plurality of registers 21-1 and 21-2, the IO control circuit 2 sets the closing flag 21-1 corresponding to the first register 21-1 for the bus closing circuit 22.

In this way, the computer system according to the first exemplary embodiment of the present invention uses the identifier (the function number) for the IO control circuit 2 and the PCI bridge 3 and performs the initial setting through the initializing configuration transaction, and the identifier in the initial setting is automatically held by the IO control circuit 2 and the PCI bridge 3. Thus, the IO control circuit 2 can specify a transmission destination of the transaction and can perform the blocking operations {(S3), (S4)} for the PCI bus on which the failure has occurred. Thus, even if the PCI bridge 3 that does not have the bus closing function is connected to the IO control circuit 2, the error recovery of the PCI can be attained.

In the (S5) closed PCI bus recovering operation, the IO control circuit 2 stores the ID (transaction ID), which is included in the first resetting configuration write transaction, in the bus reset recognizing circuit 23, and outputs the first resetting configuration write transaction to the PCI bus 4-1 and resets the PCI bus 4-1 through the bus control section 31-1. If the first identifier included in the first resetting configuration write transaction or first resetting reply transaction is coincident with the identifier stored in the first register 21-1 and if the ID stored in the bus reset recognizing circuit 23 is coincident with the ID included in the first resetting reply transaction, the IO control circuit 2 releases the closing flag 21-1 set in the bus closing circuit 22.

In this way, in the computer system according to the first exemplary embodiment of the present invention, since the reply (first resetting reply transaction) in the PCI bus 4-1 under the PCI bridge 3 is used for the releasing operation {(S5)}, releasing can be surely attained even if the PCI bridge 3 that does not have the bus closing function is connected to the IO control circuit 2. Thus, in the hardware, the closing can be automatically released, and it is possible that the driver program is unaware of the register for releasing the closing. Thus, only the register commonly defined in the PCI can be used to attain the PCI error recovery.

It should be noted that in the first exemplary embodiment, only one PCI bridge 3 is provided in the IO control circuit 2. However, the IO control circuit 2 may contain a plurality of bridge control circuits 26 and, a plurality of PCI bridges 3 may be connected to the plurality of bridge control circuits 26.

Also, for the PCI bridge 3 having the multi-stage configuration in which the PCI bridge 3 is further connected to the PCI bridge 3, the range holding circuit 21, the bus closing circuit 22 and the bus reset recognizing circuit 23 are provided in the IO control circuit 2. Thus, the foregoing operations can be attained.

Second Exemplary Embodiment

Figure 4:
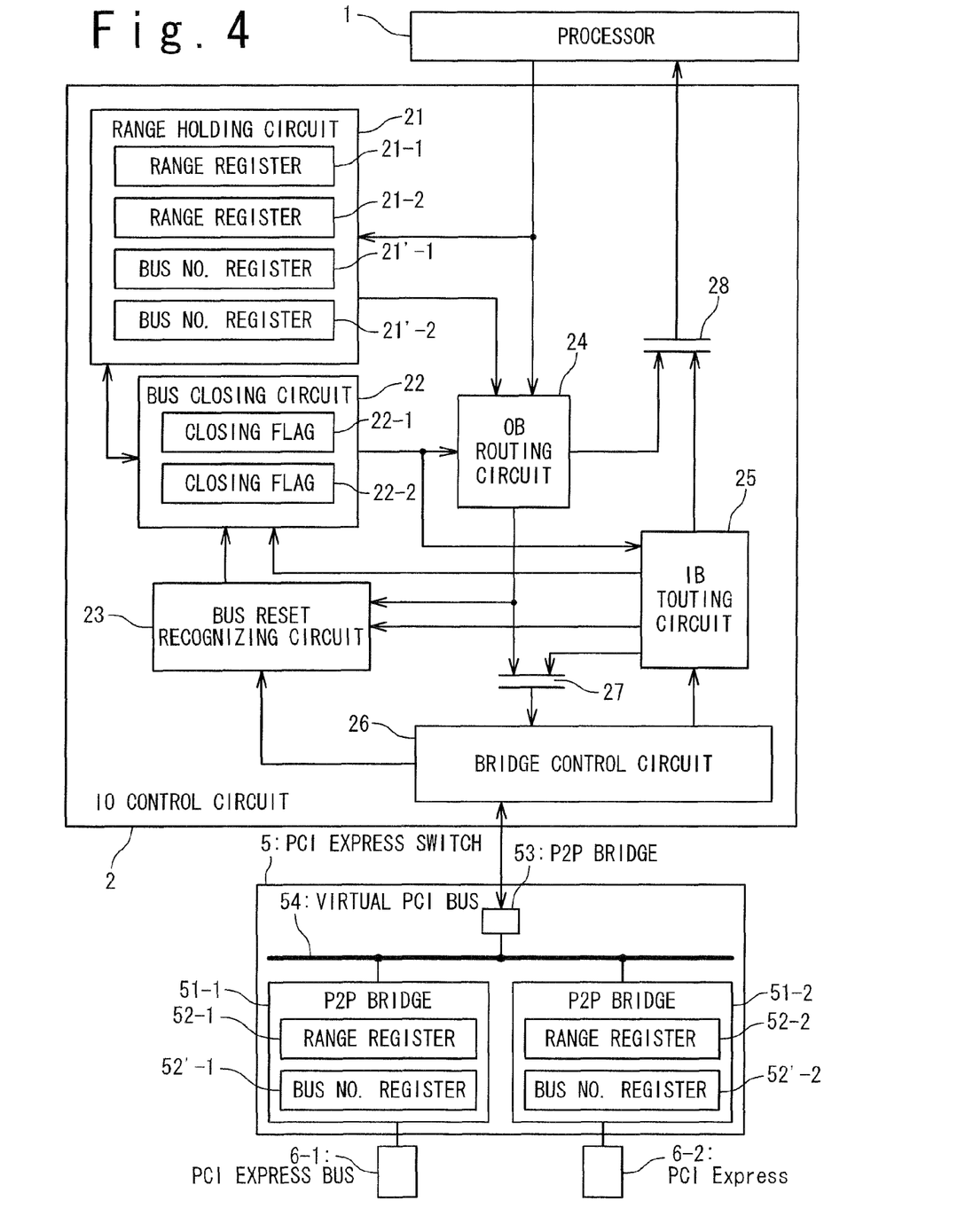
FIG. 4 shows a configuration of a computer system according to a second exemplary embodiment of the present invention.

In the computer system according to the second exemplary embodiment of the present invention, only the difference from the first exemplary embodiment will be described below. As shown in FIG. 4, as the PCI device, a PCI Express switch 5 (or, referred to as a PCI switch 5) is exemplified instead of the PCI bridge 3. The PCI Express switch 5 is connected to the IO control circuit 2.

Also, in the second exemplary embodiment, in place of the plurality of PCI buses 4-1 and 4-2 a plurality of PCI Express buses 6-1 and 6-2 (or, referred to as PCI buses 6-1 and 6-2) are connected with the PCI Express switch 5.

The range holding circuit 21 of the IO control circuit 2 further contains a plurality of bus number registers 21'-1 and 21'-2. The plurality of bus number registers 21'-1 and 21'-2 are related to the plurality of PCI buses 6-1 and 6-2, respectively. The plurality of bus number registers 21'-1 and 21'-2 store bus numbers (which will be described later).

The PCI Express switch 5 contains a plurality of P2P bridges 51-1 and 51-2, a P2P bridge 53 and a virtual PCI bus 54. The P2P bridge 53 is connected to the bridge control circuit 26. The virtual PCI bus 54 is connected to the P2P bridge 53 and the plurality of P2P bridges 51-1 and 51-2. The plurality of P2P bridges 51-1 and 51-2 correspond to the plurality of bus control sections 31-1 and 31-2 in the PCI bridge 3 and are related to the plurality of PCI Express buses 6-1 and 6-2, respectively. The plurality of P2P bridges 51-1 and 51-2 contain a plurality of range registers 52-1 and 52-2. The plurality of range registers 52-1 and 52-2 correspond to the plurality of range registers 32-1 and 32-2 in the PCI bridge 3, and they are related to the plurality of PCI Express buses 6-1 and 6-2, respectively. The plurality of range registers 52-1 and 52-2 store the function numbers serving as the device identifiers for identifying the plurality of P2P bridges 51-1 and 51-2, respectively.

The plurality of P2P bridges 51-1 and 51-2 further contain a plurality of bus number registers 52'-1 and 52'-2. The plurality of bus number registers 52'-1 and 52'-2 are correlated to the plurality of PCI buses 4-1 and 4-2, respectively. The plurality of bus number registers 52'-1 and 52'-2 store the bus numbers (which will be described later).

The configuration other than the foregoing configuration of the PCI Express switch 5 is well known. Thus, its explanation is omitted.

The operation of the computer system will be described below. As the operation of the computer system, there are listed the (S1) initializing operation, the (S2) normal operation, the (S3) PCI bus failure measuring operation, the (S4) PCI bus closing operation, and the (5) closed PCI bus recovering operation.

At first, the (S1) initializing operation will be described. The initialization of the PCI Express switch 5 is performed by the first and second initializing configuration write transactions for the range registers 52-1 and 52-2 and the bus number registers 52'-1 and 52'-2 (referred to as a bus walk).

At first, the processor 1 issues the first initializing configuration write transaction to the range register 51-1 and the bus number register 52'-1. The first initializing configuration write transaction is outputted to the OB (Outbound) direction. That is, the processor 1 outputs the first initializing configuration write transaction to the IO control circuit 2, and the OB routing circuit 24 in the IO control circuit 2 outputs the first initializing configuration write transaction through the selector 27 to the bridge control circuit 26. The bridge control circuit 26 outputs the first initializing configuration write transaction to the PCI Express switch 5. The P2P bridge 51-1 in the PCI Express switch 5 performs the first initializing configuration write transaction from the bridge control circuit 26 through the P2P bridge 53 and the virtual PCI bus 54. The P2P bridge 51-1 stores the first function number, which is included in the first address of the first initializing configuration write transaction, in the range register 52-1. Also, the P2P bridge 51-1 stores the bus number in the bus number register 52'-1, and the bus number is obtained by adding "1" to a first bus number included in the first address, as the bus number in which the virtual PCI bus 54 is considered.

The P2P bridge 51-1 in the PCI Express switch 5 outputs a first initializing reply transaction, which is a reply for the first initializing configuration write transaction, to the processor 1 through the IO control circuit 2. The range holding circuit 21 in the IO control circuit 2 stores the first function number, which is included in the first address, in the range register 21-1 in response to the first initializing configuration write transaction. Also, the range holding circuit 21 stores the bus number in which "1" is added to the first bus number included in the first address, in the bus number register 21'-1 as the bus number in which the virtual PCI bus 54 is considered.

Next, the processor 1 issues a second initializing configuration write transaction for the range register 32-2. As a result, at the time of the completion of the (S1) initializing operation, the same value (the first function number) is stored in the range registers 21-1 and 52-1, and the same value (the second function number) is stored in the range registers 21-2 and 52-2. Also, the same value (the first function number) is stored in the bus number registers 21'-1 and 52'-1, and the same value (the second function number) is stored in the bus number registers 21'-2 and 52'-2. The bus number is changed for each time of the increase or decrease in the IO card, and this cannot be fixed. Thus, the value at the time of the bus WALK is required to be held.

The (S2) normal operation will be described below. Here, as for the above explanation of the (S2) normal operation, it is adequate to replace the PCI bridge 3 with the PCI Express switch 5, replace the bus control sections 31-1 and 31-2 with the P2P bridges 51-1 and 51-2, and replace the PCI buses 4-1 and 4-2 with the PCI buses 6-1 and 6-2. Thus, their detailed explanation is omitted.

The (S3) PCI bus failure measuring operation will be described below. When the failure has occurred in the PCI buses 6-1 and 6-2, the P2P bridges 51-1 and 51-2 generate the error message. This will be specifically described.

For example, when the failure has occurred on the PCI bus 6-1, the P2P bridge 51-1 generates an error message transaction. This error message transaction includes a transaction ID. The first function number stored in the range register 52-1 in the P2P bridge 51-1 and the first bus number stored in the bus number register 52'-1 in the P2P bridge 51-1 are added to the transaction ID. The error message transaction is outputted to the IB direction. In this case, the P2P bridge 51-1 outputs the error message transaction to the IO control circuit 2. The bridge control circuit 26 in the IO control circuit 2 outputs the error message transaction to the IB routing circuit 25. The IB routing circuit 25 outputs the error message transaction to the bus closing circuit 22. The bus closing circuit 22 extracts the first function number and the first bus number from the error message transaction and compares with the function numbers stored in the range registers 21-1 and 21-2 in the range holding circuit 21 and the bus numbers stored in the bus number registers 21'-1 and 21'-2. Consequently, the bus closing circuit 22 specifies the PCI bus on which the failure has occurred, and then sets the closing flag corresponding thereto. In this case, the extracted first function number is coincident with the function number stored in the range register 21-1, and the extracted first bus number is coincident with the bus number stored in the bus number register 21'-1. Thus, the bus closing circuit 22 sets the closing flag 22-1. The IO control circuit 2 sets this closing flag 22-1 and consequently controls to close the PCI bus 4-1.

The (S4) PCI bus closing operation will be described below. Here, as for the above explanation of the (S4) PCI bus closing operation, it is adequate to replace the PCI bridge 3 with the PCI Express switch 5, replace the bus control sections 31-1 and 31-2 with the P2P bridges 51-1 and 51-2, and replace the PCI buses 4-1 and 4-2 with the PCI buses 6-1 and 6-2. Thus, the detailed explanation is omitted.

The (S5) closed PCI bus recovering operation will be described below. The driver program is executed by the processor 1 to reset the PCI bus and to consequently recover the closed PCI bus. This will be specifically described.

The driver program issues the first resetting configuration write transaction to the reset register in the PCI bus 6-1. The first resetting configuration write transaction includes the first address and the transaction ID, and this is outputted to the OB (Outbound) direction. That is, the driver program outputs the first resetting configuration write transaction to the IO control circuit 2. The OB routing circuit 24 in the IO control circuit 2 outputs the first resetting configuration write transaction to the bridge control circuit 26 through the selector 27. The bridge control circuit 26 outputs the first resetting configuration write transaction to the PCI Express switch 5. Here, the first function number included in the first address of the first resetting configuration write transaction is coincident with the function number stored in the range register 52-1 in the P2P bridge 51-1. Also, the first register number included in the first address is coincident with the register number assigned to the reset register in the PCI bus 6-1. In this case, the P2P bridge 51-1 in the PCI Express switch 5 performs the first resetting configuration write transaction from the bridge control circuit 26. The P2P bridge 51-1, since the reset register in the closed PCI bus 6-1 is set to "1" in response to the first resetting configuration write transaction to reset the PCI bus 6-1.

In this way, the P2P bridge 51-1 in the PCI Express switch 5 generates a first resetting reply transaction as a reply for the first resetting configuration write transaction. This first resetting reply transaction includes a first address and a transaction ID, and the transaction is outputted to the IB direction. That is, the P2P bridge 51-1 outputs the first resetting reply transaction to the IO control circuit 2. The bridge control circuit 26 in the IO control circuit 2 outputs the first resetting reply transaction to the IB routing circuit 25. The IB routing circuit 25 outputs the first resetting reply transaction to the bus reset recognizing circuit 23, and outputs to the driver program through the selector 28.

The bus reset recognizing circuit 23 holds the transaction ID in response to the first resetting configuration write transaction. The transaction ID included in the first resetting reply transaction is coincident with the transaction ID held by the bus reset recognizing circuit 23. Also, the first function number included in the first address of the first resetting reply transaction is coincident with the function number stored in the range register 21-1 in the range holding circuit 21. The bus number when the virtual PCI bus 54 is considered by adding "1" to the first bus number included in the first address is coincident with the bus number stored in the bus number register 21'-1 in the range holding circuit 21. In this case, the bus reset recognizing circuit 23 determines that the resetting of the targeted PCI bus 6-1 is completed and then outputs the first reset instruction for releasing the closing flag 22-1 corresponding to the range register 21-1 to the bus closing circuit 22. The bus closing circuit 22 releases the closing flag 22-1 in response to the first resetting configuration write transaction.

The IO control circuit 2 releases this closing flag 22-1 and to consequently release the closing of the PCI bus 6-1. The reason why the bus reset recognizing circuit 23 waits for the first resetting reply transaction and then releases the setting of the closing flag 22-1 is to prevent any illegal request from the closed PCI bus 6-1 from being sent to the processor 1, if releasing the setting of the closing flag 22-1 prior to the request (before the closed PCI bus 6-1 is recovered).

The operation of the computer system according to the second exemplary embodiment of the present invention can be attained by replacing the PCI bridge 3 with the PCI Express switch 5, replacing the bus control sections 31-1 and 31-2 with the P2P bridges 51-1 and 51-2, and replacing the PCI buses 4-1 and 4-2 with the PCI buses 6-1 and 6-2. Thus, the detailed explanation is omitted.

As mentioned above, in the computer system according to the second exemplary embodiment of the present invention, even if the PCI Express switch 5 is connected to the IO control circuit 2 and further the plurality of PCI buses are connected to the PCI Express switch 5, the PCI bus 6-1 on which the failure has occurred can be closed with the same reason as the first exemplary embodiment.

Also, in the computer system according to the second exemplary embodiment of the present invention, even if the failure has occurred on the PCI bus 6-1, the error recovery can be surely performed by carrying out the recovering and continuing operation without any stop of the system, with the same reason as the first exemplary embodiment.

The computer system according to the second exemplary embodiment of the present invention uses the identifiers (the function number, the bus number) for the IO control circuit 2 and the PCI Express switch 5 and performs the initial setting through the initializing configuration write transaction, and the identifiers in the initial setting are automatically held by the IO control circuit 2 and the PCI Express switch 5. Thus, the IO control circuit 2 can specify the transmission destination of the transaction and can execute the blocking operations {(S3), (S4)} for the PCI bus on which the failure has occurred. Hence, even if the PCI Express switch 5 that does not have the bus closing function is connected to the group of the IO control circuit 2, the error recovery of the PCI can be attained.

Also, in the computer system according to the second exemplary embodiment of the present invention, in the releasing operation {(S5)}, the reply (the first resetting reply transaction) in the PCI bus 6-1 under the PCI Express switch 5 is used, which can insure that the resetting is surely performed, even if the PCI Express switch 5 that does not have the bus closing function is connected to the IO control circuit 2. Thus, in the hardware, the closing can be automatically released, and it is possible that the driver program is unaware of the register for releasing the closing. Thus, only the register commonly defined in the PCI can be used to attain the PCI error recovery.

It should be noted that in the second exemplary embodiment, only one PCI Express switch 5 is provided in the IO control circuit 2. However, the IO control circuit 2 may contain a plurality of bridge control circuits 26, and a plurality of PCI Express switches 5 may connected to the plurality of bridge control circuits 26.

Also, for the PCI Express switch 5 having the multi-stage configuration in which the PCI Express switch 5 is further connected to the PCI Express switch 5, the range holding circuit 21, the bus closing circuit 22 and the bus reset recognizing circuit 23 are provided in the IO control circuit 2. Thus, the foregoing operations can be attained.

Also, in the computer system according to the first and second exemplary embodiments of the present invention, the device (PCI bridge 3 or PCI Express switch 5) is connected to the IO control circuit 2, and the PCIs are applied as the plurality of buses connected to the device 3 or 5. However, the present invention is not limited to this.

In the computer system according to the first and second exemplary embodiments of the present invention, Star Fabric can be applied instead of the PCI. In this case, in FIGS. 1 to 4, the PCI may be replaced with Star Fabric.

Also, in the computer system according to the first and second exemplary embodiments of the present invention, Advanced Switching Interconnect (ASI) can be also applied instead of the PCI. In this case, in FIGS. 1 to 4, the PCI may be replaced with ASI.

As mentioned above, in the computer system of the present invention, even if the device is connected to the group of the IO control circuit and then the plurality of buses are connected to the group of the device, the bus on which the failure has occurred can be closed.

Although the present invention has been described above in connection with several exemplary embodiments thereof, it would be apparent to those skilled in the art that those embodiments are provided solely for illustrating the present invention, and should not be relied upon to construe the appended claims in a limiting sense.

What is claimed is:

1. A computer system comprising:
  a plurality of buses;
  a device connected with said plurality of buses and configured to generate an error message when a failure has occurred on a first bus of said plurality of buses; and
  an IO control circuit connected with said device and configured to close said first bus in response to said error message,
  said IO control circuit stops the output of said first operation transaction from said transmission source to said first bus in a bus closed state in which said first bus is closed,
  wherein said IO control circuit further comprises a plurality of IO control registers corresponding to said plurality of buses, respectively,
  wherein said device comprises
  wherein said device comprises a plurality of bus control sections respectively connected with said plurality of buses, said IO control circuit outputs a first operation transaction from a transmission source to said first bus through a first bus control section of said plurality of bus control sections in a normal operation, and closes said first bus in response to an error message transaction in a bus failure operation when the failure has occurred on said first bus, said IO control circuit stops the output of said first operation transaction from said transmission source to said first bus in a bus closed state in which said first bus is closed, said plurality of bus control sections comprise a plurality of registers corresponding to said plurality of buses, respectively, said IO control circuit receives a plurality of initialization configuration write transactions from said transmission source, each of said plurality of initialization configuration write transactions containing an identifier, said IO control circuit stores said plurality of identifiers which are contained in said plurality of initialization configuration write transactions in said plurality of IO control registers, and outputs said plurality of initialization configuration write transactions to said plurality of bus control sections, respectively, said plurality of bus control sections store said plurality of identifiers which are contained in said plurality of initialization configuration write transactions in said plurality of registers, said IO control circuit further comprises a bus reset recognition circuit, in a closed bus recovery operation, said first reset configuration write transaction contains said first identifier and an ID, said IO control circuit stores said ID contained in said first reset configuration write transaction in said bus reset recognition circuit, and outputs said first reset configuration write transaction to said first bus through said first bus control section to reset said first bus, said first reset reply transaction contains said first identifier and said ID contained in said first reset configuration write transaction, and said IO control circuit deletes said closing data set to said bus closing circuit when said first identifier contained in said first reset configuration write transaction or said first reset reply configuration transaction is coincident with said identifier stored in said first IO control register and when said ID stored in said bus reset recognition circuit is coincident with the ID contained in said first reset reply transaction.

2. The computer system according to claim 1, wherein in said bus closed state, said IO control circuit discards said first operation transaction when said first operation transaction is a transaction that a reply is not required, and generates a first closing transaction indicating that said first bus is closed when said first operation transaction is a transaction that a reply is required.

3. The computer system according to claim 1, wherein said IO control circuit comprises a bus closing circuit, said IO control circuit sets closing data for said first bus to said bus closing circuit based on said error message transaction in said bus failure operation, and said IO control circuit stops the output of said first operation transaction from said transmission source onto said first bus in said bus failure operation in which said closing data is set to said bus closing circuit.

4. A computer system comprising:
a plurality of buses;
a device connected with said plurality of buses and configured to generate an error message when a failure has occurred on a first bus of said plurality of buses; and an IO control circuit connected with said device and configured to close said first bus in response to said error message, wherein said device comprises a plurality of bus control sections respectively connected with said plurality of buses, said IO control circuit outputs a first operation transaction from a transmission source to said first bus through a first bus control section of said plurality of bus control sections in a normal operation, and closes said first bus in response to an error message transaction in a bus failure operation when the failure has occurred on said first bus, said IO control circuit stops the output of said first operation transaction from said transmission source to said first bus in a bus closed state in which said first bus is closed, said IO control circuit comprises a bus closing circuit, said IO control circuit sets closing data for said first bus to said bus closing circuit based on said error message transaction in said bus failure operation, said IO control circuit stops the output of said first operation transaction from said transmission source onto said first bus in said bus failure operation in which said closing data is set to said bus closing circuit, said IO control circuit outputs a first reset configuration write transaction to said first bus through said first bus control section to reset said first bus in a closed bus recovery operation when said first bus is recovered, said first bus control section outputs a first reset reply transaction as a reply to said first reset configuration write transaction to said transmission source through said IO control circuit, said IO control circuit deletes said closing data set to said bus closing circuit in response to said first reset configuration write transaction, and said IO control circuit outputs said first operation transaction from said transmission source to said first bus through said first bus control section.

5. The computer system according to claim 4, wherein said IO control circuit further comprises a plurality of IO control registers corresponding to said plurality of buses, respectively, said plurality of bus control sections comprise a plurality of registers corresponding to said plurality of buses, respectively, said IO control circuit receives a plurality of initialization configuration write transactions from said transmission source, each of said plurality of initialization configuration write transactions containing an identifier, said IO control circuit stores said plurality of identifiers which are contained in said plurality of initialization configuration write transactions in said plurality of IO control registers, and outputs said plurality of initialization configuration write transactions to said plurality of bus control sections, respectively, and said plurality of bus control sections store said plurality of identifiers which are contained in said plurality of initialization configuration write transactions in said plurality of registers.

6. The computer system according to claim 5, wherein said plurality of bus control sections output a plurality of initialization reply transactions as replies to said plurality of initialization configuration write transactions to said transmission source through said IO control circuit when said initialization operation is executed.

7. The computer system according to claim 5, wherein in said bus closed state, said error message transaction contains a first identifier stored in a first register of said plurality of registers, and said IO control circuit sets said closing data corresponding to a first IO control register of said plurality of IO control registers in said bus closing circuit when said first identifier contained in said error message transaction is coincident with an identifier stored in said first IO control register.

8. A method of controlling closing of each of a plurality of buses which are connected with a device in a computer system, comprising:

generating an error message from said device when a failure has occurred on a first bus of said plurality of buses; and closing said first bus in response to said error message, wherein said device comprises a plurality of bus control sections respectively connected with said plurality of buses, said method further comprises:

outputting a first operation transaction from a transmission source to said first bus through a first bus control section of said plurality of bus control sections in a normal operation;

discarding said first operation transaction when said first operation transaction is a transaction that a reply is not required, in a bus closed state in which said first bus is closed; and generating a first closing transaction indicating that said first bus is closed when said first operation transaction is a transaction that a reply is required, in the bus closed state, said closing comprises:

setting closing data for said first bus to a bus closing circuit in response to said error message transaction in said bus closed state, said method further comprises:

outputting a first reset configuration write transaction to said first bus through said first bus control section to reset said first bus in a closed bus recovery operation;

outputting a first reset reply transaction as a reply to said first reset configuration write transaction from said first bus control section to said transmission source; and deleting said closing data set in said bus closing circuit in response to said first reset configuration write transaction.

9. The method according to claim 8, further comprising:

outputting a plurality of initialization configuration write transactions with identifiers from said transmission source to said plurality of bus control sections;

storing said identifiers of said plurality of initialization configuration write transactions in a plurality of IO control registers, respectively;

storing said identifiers of said plurality of initialization configuration write transactions in a plurality of registers of said plurality of bus control sections, respectively; and outputting a plurality of initialization reply transactions from said plurality of bus control sections to said transmission source.

10. The method according to claim 9, wherein said error message transaction contains a first identifier stored in a first register of said plurality of registers, and said setting closing data comprises:

setting said closing data to a first IO control register of said plurality of IO control registers in said bus closing circuit when said first identifier contained in said error message transaction is coincident with an identifier stored in said first IO control register.

11. The method according to claim 10, wherein said first reset configuration write transaction contains said first identifier and an ID, said outputting a first reset configuration write transaction comprises:

storing said ID contained in said first reset configuration write transaction in a bus reset recognition circuit;

said first reset reply transaction contains said first identifier and said ID contained in said first reset configuration write transaction, and said deleting comprises:

deleting said closing data set in said bus closing circuit, when said first identifier contained in said first reset configuration write transaction or said first reset reply configuration transaction is coincident with said identifier stored in said first IO control register and when said ID stored in said bus reset recognition circuit is coincident with the ID contained in said first reset reply transaction.

12. A computer system comprising:

a processor;

an IO control circuit connected with said processor; and a device connected with said IO control circuit and a plurality of buses, wherein said device comprises:

error message generating means for generating an error message when a failure has occurred on a first bus of said plurality of buses, said IO control circuit comprises:

closing means for closing said first bus in response to said error message, said closing means comprises:

setting means for setting closing data for said first bus to a bus closing circuit in response to said error message transaction in said bus closed state, said processor outputs a first reset configuration write transaction to said first bus through said first bus control section in a closed bus recovery operation, said computer system further comprises:

resetting means for resetting said first bus, outputting a first reset reply transaction as a reply to said first reset configuration write transaction to said processor; and deleting means for deleting said closing data set in said bus closing circuit in response to said first reset configuration write transaction.

13. The computer system according to claim 12, wherein said device comprises a plurality of bus control sections respectively connected with said plurality of buses, said processor outputs a first operation transaction to said first bus through a first bus control section of said plurality of bus control sections in a normal operation, said IO control circuit comprises:

discarding means for discarding said first operation transaction when said first operation transaction is a transaction that a reply is not required, in a bus closed state in which said first bus is closed; and closing transaction generating means for generating a first closing transaction indicating that said first bus is closed when said first operation transaction is a transaction that a reply is required, in the bus closed state.

* * * * *